L. D. JOHNSON.
NUT LOCK.
APPLICATION FILED JULY 30, 1914.

1,134,274.

Patented Apr. 6, 1915.

WITNESSES:
J. B. Webster
F. M. Blanchard

INVENTOR.
Louis D. Johnson
BY
Jerry Webster
ATTORNEY

UNITED STATES PATENT OFFICE.

LOUIS D. JOHNSON, OF STOCKTON, CALIFORNIA.

NUT-LOCK.

1,134,274.   Specification of Letters Patent.   Patented Apr. 6, 1915.

Application filed July 30, 1914. Serial No. 854,065.

*To all whom it may concern:*

Be it known that I, LOUIS D. JOHNSON, a citizen of the United States, residing at Stockton, in the county of San Joaquin, State of California, have invented certain new and useful Improvements in Nut-Locks; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in devices used for locking nuts upon the bolts and preventing them from backing or creeping off the bolt with the consequential loosening of machinery or other parts being held together.

The object of the invention is to produce a nut lock which will lock the nut at any place on the threads of the bolt either when the bolt is in tension between adjacent parts or placed upon the threads to be used as a stop or safety of some kind.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1:
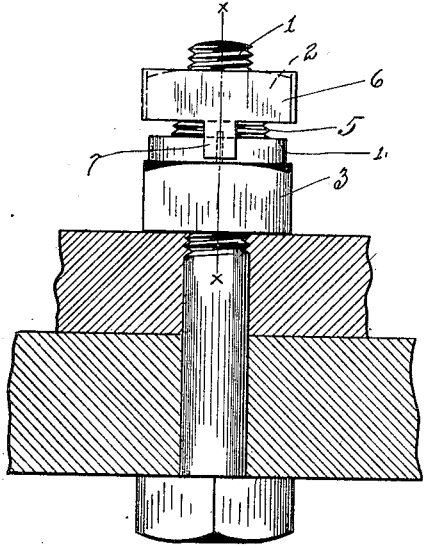
Figure 2:
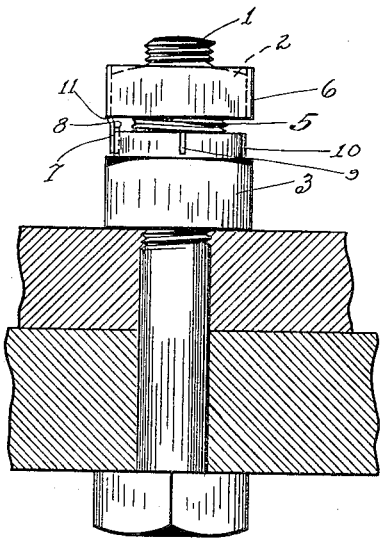
Figure 3:
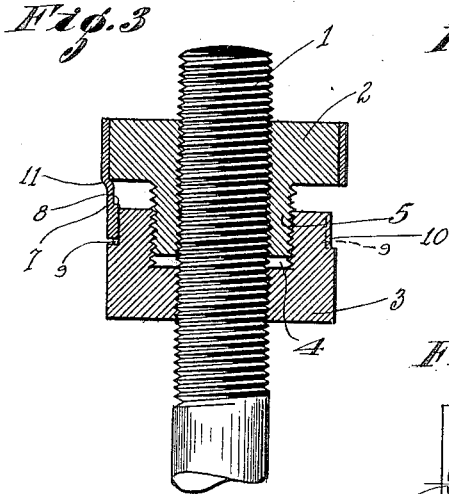
Figure 4:
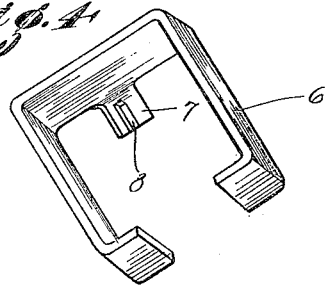
Figure 5:
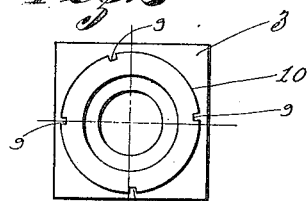

Figure 1 is a side view of the nut lock. Fig. 2 is a side view of the same taken at right angles to Fig. 1. Fig. 3 is a sectional view taken on a line X—X of Fig. 1. Fig. 4 is a perspective view of the clamp. Fig. 5 is a top view of the lower member of the nut.

Referring now more particularly to the characters of reference on the drawings, the numeral 1 indicates a threaded bolt upon which is screwed a member 2 and a nut 3. The nut 3 is recessed and threaded, as at 4, for the reception of the portion 5 of the locking member 2. These threads 4 are of the opposite hand to the threads provided upon the bolt 1 and it is through this means that I obtain my lock.

The members 2 and 3 are first fastened together by means of the threads 4 and then screwed upon the bolt acting together as if they were one piece. The nut being in the desired position, the locking member 2 is then turned in the opposite direction to the advancing movement of the nut 3 whereupon the said member will, because of the movement imparted by the threads 4 which are of an opposite hand to those of the bolt, move toward the nut 3 until the faces of the threads in both the locking member 2 and on the bolt are jammed securely against each other.

To prevent any possible movement of the locking member 2, a clamp 6 is then sprung into place, said clamp having a lip 7 integral with which is a lug 8 adapted to fit into slots 9 cut into the rounded portion 10 of the nut 3.

The member 2 is made slightly larger than the outside diameter of the portion 10 so that the lip 7 of the clamp 6 will have to be slightly offset, as at 11, in order to bring the said lip against the portion 10 of the nut 3, thereby providing a means of holding the clamp rigidly and securely in place.

From the foregoing description it will readily be seen that I have produced such a device as substantially fulfills the objects of the invention as set forth herein.

While this specification sets forth in detail the present and preferred construction of the device, still in practice, such deviations from such details may be resorted to as do not form a departure from the spirit of the invention, as defined by the appended claim.

Having thus described my invention what I claim as new and useful and desire to secure by Letters Patent is:—

A device of the character described comprising the combination with a bolt, of a nut mounted on said bolt and having an annular portion provided with a plurality of slots on its periphery, a locking nut mounted on the bolt and threaded into said nut, such threading being the reverse to the threading on the bolt whereby said locking nut may be moved to lock said nuts on said bolt, a clamp engageable with said locking nut in different positions, and a lug on said clamp engageable with one of said slots, as described.

In testimony whereof I affix my signature in presence of two witnesses.

LOUIS D. JOHNSON.

Witnesses:
JOSHUA B. WEBSTER,
FLOYD M. BLANCHARD.

Copies of this patent may be obtained for five cents each, by addressing the "Commissioner of Patents, Washington, D. C."